(12) United States Patent
Auger et al.

(10) Patent No.: US 11,092,732 B2
(45) Date of Patent: Aug. 17, 2021

(54) LENS SYSTEM AND METHOD

(71) Applicant: Harman International Industries, Incorporated, Stamford, CT (US)

(72) Inventors: Elijah Auger, Fenton, MI (US); Rashmi Rao, West Bloomfield, MI (US); Sabin Oana, Howell, MI (US)

(73) Assignee: Harman International Industries, Incorporates, Stamford, CT (US)

( * ) Notice: Subject to any disclaimer, the term of this patent is extended or adjusted under 35 U.S.C. 154(b) by 127 days.

(21) Appl. No.: 16/062,128

(22) PCT Filed: Dec. 6, 2016

(86) PCT No.: PCT/US2016/065071
§ 371 (c)(1),
(2) Date: Jun. 14, 2018

(87) PCT Pub. No.: WO2017/105911
PCT Pub. Date: Jun. 22, 2017

(65) Prior Publication Data
US 2018/0372936 A1    Dec. 27, 2018

Related U.S. Application Data

(60) Provisional application No. 62/269,621, filed on Dec. 18, 2015.

(51) Int. Cl.
*F21V 8/00* (2006.01)
*B29D 11/00* (2006.01)
*B60Q 3/10* (2017.01)

(52) U.S. Cl.
CPC .............. *G02B 6/003* (2013.01); *B29D 11/00* (2013.01); *B29D 11/00009* (2013.01); *B29D 11/0073* (2013.01); *B60Q 3/10* (2017.02)

(58) Field of Classification Search
CPC .. G02B 6/003; B29D 11/00; B29D 11/00009; B29D 11/0073; B60Q 3/10
See application file for complete search history.

(56) References Cited

U.S. PATENT DOCUMENTS 8,384,812 B2 *   2/2013   Yamamoto ............... G02B 7/04
                                                    348/294
2008/0165139 A1 * 7/2008   Hotelling ................. G09G 3/36
                                                    345/173

(Continued)

*Primary Examiner* — Evan P Dzierzynski
(74) *Attorney, Agent, or Firm* — Brooks Kushman, P.C.

(57) ABSTRACT

A lens assembly structures and methods are described with a glass surface facing user. The lens assembly may include a retention film on a rear surface of the glass layer with the front surface being free of a safety layer. The lens assembly may include a glass layer with a front surface to be engaged by a person and a rear surface and a retention film fixed to the rear surface and is transparent. A display generator may be fixed to the retention film. A spacing layer may be fixed on the retention film around the display generator. A mask may be fixed to a rear surface of the glass beneath the retention film. A support frame may engage the spacing layer and support the display generator with the glass layer being supported by the retention film and mechanically supported by both the display generator and the frame. The front surface may be free from a retention layer.

17 Claims, 5 Drawing Sheets

(56) References Cited

U.S. PATENT DOCUMENTS

| | | | |
|---|---|---|---|
| 2010/0328743 A1* | 12/2010 | Wolterink | G02B 27/4211 |
| | | | 359/19 |
| 2011/0215685 A1 | 9/2011 | Jarvis et al. | |
| 2012/0281381 A1 | 11/2012 | Sanford et al. | |
| 2014/0352355 A1 | 12/2014 | Boudreau et al. | |
| 2015/0002926 A1 | 1/2015 | Matarieh et al. | |
| 2015/0323723 A1* | 11/2015 | Lai | G06F 3/047 |
| | | | 359/489.07 |
| 2017/0308124 A1* | 10/2017 | Mathew | H04N 5/64 |
| 2021/0094251 A1* | 4/2021 | Bruce | B29D 11/0073 |

* cited by examiner

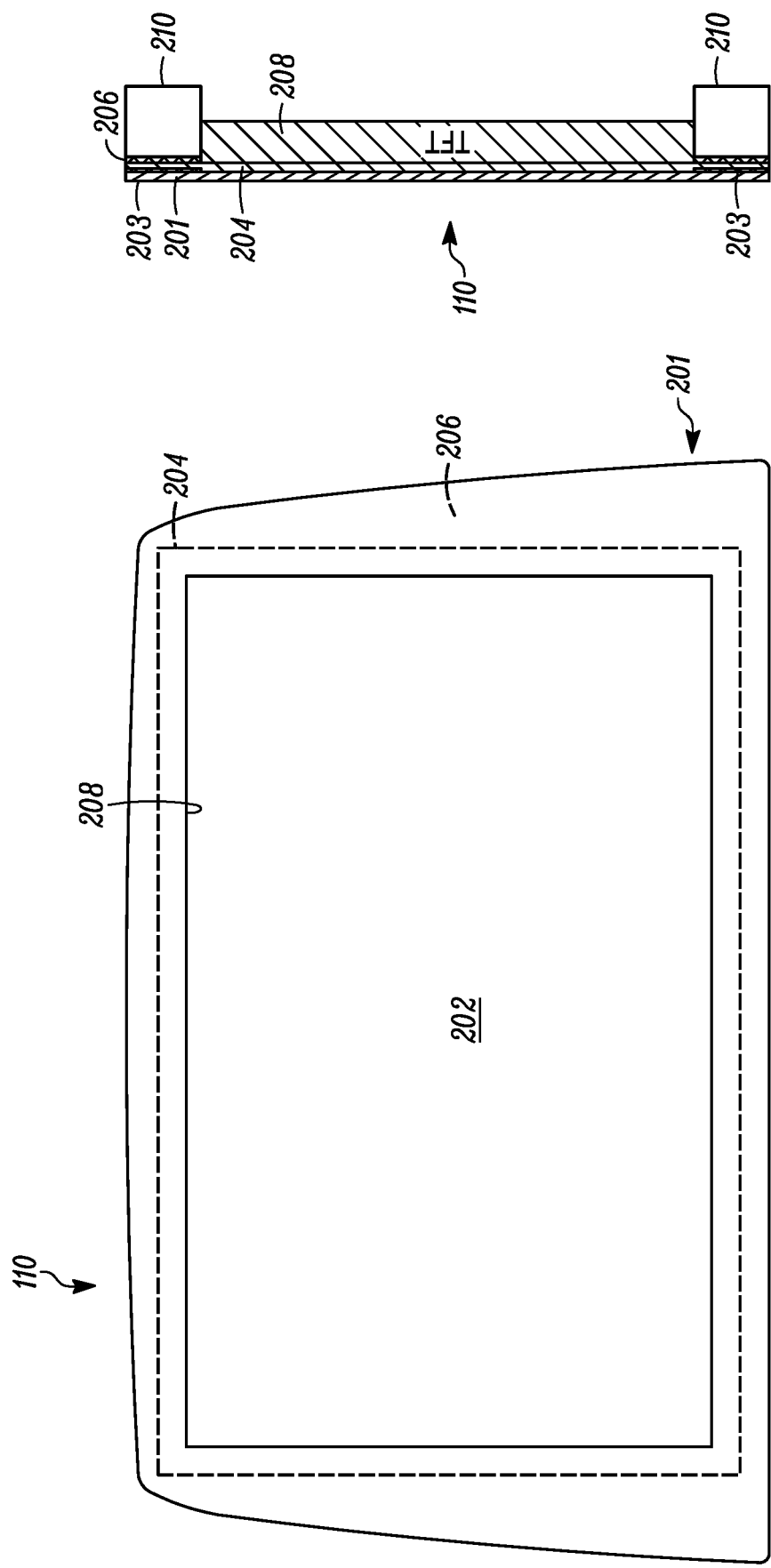

ND METHOD

LENS SYSTEM AND METHOD

CROSS-REFERENCE TO RELATED APPLICATION

This application is the U.S. national phase of PCT Application No. PCT/US2016/065071 filed on Dec. 6, 2016, which claims the benefit of U.S. Provisional Patent Application No. 62/269,621 filed on Dec. 18, 2015, the disclosures of which are incorporated in their entirety by reference herein.

This application claims the benefit of U.S. provisional application Ser. No. 62/269,621 filed Dec. 18, 2015, the disclosure of which is hereby incorporated in its entirety by reference herein.

TECHNICAL FIELD

Aspects disclosed herein generally relate to transparent lenses for electronic device, and more specifically, to surface modules or lenses with safety glass that can be mounted in vehicles or other devices.

BACKGROUND

Glass is often used as a material in vehicles and particularly for automotive interior styling designs. Glass is further used as an interface from electronics to its user or other people. Glass is further used as a lens over certain electronics or other machine to human interfaces. It is desired and sometimes required that the glass perform to certain safety levels, e.g., European Union standard, ECE R21, and US Department of Transportation FMVSS 201, among others. The regulatory landscape for automotive products limits the types of glass that are traditionally employed for display surfaces, cover lenses, and the like. Traditionally, glass (defined as a material composed of silicon dioxide, a flux material, and a stabilizer) is coated with a polymeric film to ensure that during impact, the glass surface does not create a dangerous condition for the occupants of the vehicle. For example, upon the glass breaking or shattering, no sharp edges are permitted.

SUMMARY

A lens assembly is described with the retention layer on a rear surface of the glass layer. In an example embodiment, a lens assembly may include a glass layer with a first side to be engaged by a person and a second side and a retention layer fixed to the second side and is transparent. A display generator may be fixed to the retention layer. A spacing layer may be fixed on the retention layer around the display generator. A support frame may engage the spacing layer and support the display generator with the glass layer being supported by the retention film and mechanically supported by both the display generator and the frame. The first side may be free from the treatment layer.

In an example embodiment, a mask applied to the glass layer to define a display area.

In an example embodiment, the mask is applied before the retention layer is added to the second side of the glass layer.

In an example embodiment, the spacing layer is compressed by the frame onto the glass layer.

In an example embodiment, the first side is a front side of the glass layer and is treated with atomic layer deposition or ionic treatment to cure defects in the glass layer.

In an example embodiment, the glass layer is supported about its entire area by the retention film and mechanically supported by both the display generator and the frame, e.g., in the areas where the glass layer is extending beyond the outline of the display generator.

In an example embodiment, the support frame is adapted to be mounted in a vehicle as an infotainment device or an instrument cluster, or in a portable electronic device.

In an example embodiment, the mask extends inwardly further than the spacing layer.

In an example embodiment, the glass layer is supported about its entire area by the retention layer and mechanically supported by both the display generator and the frame.

In an example embodiment, the second side is a rear side remote from a user.

In an example embodiment, the spacing layer is compressed by the frame onto the glass layer.

Methods for fabricating a lens assembly are also described. An assembly method may include fixing a mask on a rear surface of a glass layer and fixing a retention layer to over the mask layer and the rear surface of a glass layer with a front surface of the glass layer being free from a retention layer. The method may include fixing a spacing layer on a perimeter of the retention layer over at least part of the masking layer. The method may include fixing a display generator fixed to the retention layer within the spacing layer. The method may include engaging a support frame to the spacing layer to support the display generator and to support the glass layer through the spacing layer and the retention film. Alternatively, the method may forgo the use of a perimeter bond instead using an optically clear adhesive film or resin between the active area of the display generator and the visible window defined by the mask on the back side of the glass lens.

In an example embodiment, fixing the mask includes defining a display area through the glass layer interior of the mask layer.

In an example embodiment, fixing the mask is performed before fixing the retention layer such that the mask layer is intermediate the rear surface of the glass layer and retention layer around a perimeter of the glass layer.

In an example embodiment, engaging the support frame includes compressing the spacing layer against the retention layer.

In an example embodiment, fixing the spacing layer includes fixing a spacing layer that has a dimension that extends radially inwardly less than the mask, and wherein fixing the display generator includes fixing a thin film transistor layer within the spacer layer and over an inner edge of the mask.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 3 depicts a front view of the lens assembly in accordance to an embodiment;

FIG. 4 depicts a cross sectional view of a lens assembly in accordance to an embodiment;

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present description describes lens assemblies, e.g., human to machine interfaces or transparent surfaces, for use in various structures and environments, e.g., vehicle, automotive, portable electronics, displays, appliances and the like. The lens assembly may be used as a touch surface for a person to interact with the device in which the lens assembly is mounted. In another example, the lens assembly may be viewed by the person facing part of a display. It is desired that the surface that a person touches be glass. However, safety regulations may require that the glass be coated with a safety film to prevent sharp edges if the glass breaks. People generally prefer the feel of the glass and not a coating on the glass. Accordingly, the present disclosure describes a lens assembly meeting this safety requirement by having the safety film on the back (e.g., non-touch) side of the glass. The back side (e.g., surface) may be encased by a housing, a component or a vehicle so that it cannot be accessed by a person. The safety film or coating can be on the rear of the glass (e.g., away from the person or the interior cabin of the vehicle). As a result, the lens assembly will be impact resistant, compliant to governmental regulatory standards, e.g., ECE R21 (Economic Commission for Europe Regulation 21) and FMVSS 201 (Federal Motor Vehicle Safety Standard 201). Moreover, the lens assembly need not have a geometry that exactly matches the size and shape as display it covers. Accordingly, designers can leverage complex 2D design geometries (i.e., non-rectangular) and keep a "premium" touch experience by using a real glass touch surface rather than a polymer film touch surface. A premium touch experience may be one that imparts a user with a feeling or belief in that the experience, e.g., touching the screen, is above an average experience. For a touch screen, some users perceive touching glass to be a premium experience relative to touching a polymer screen or a polymer covered glass screen.

Figure 1:
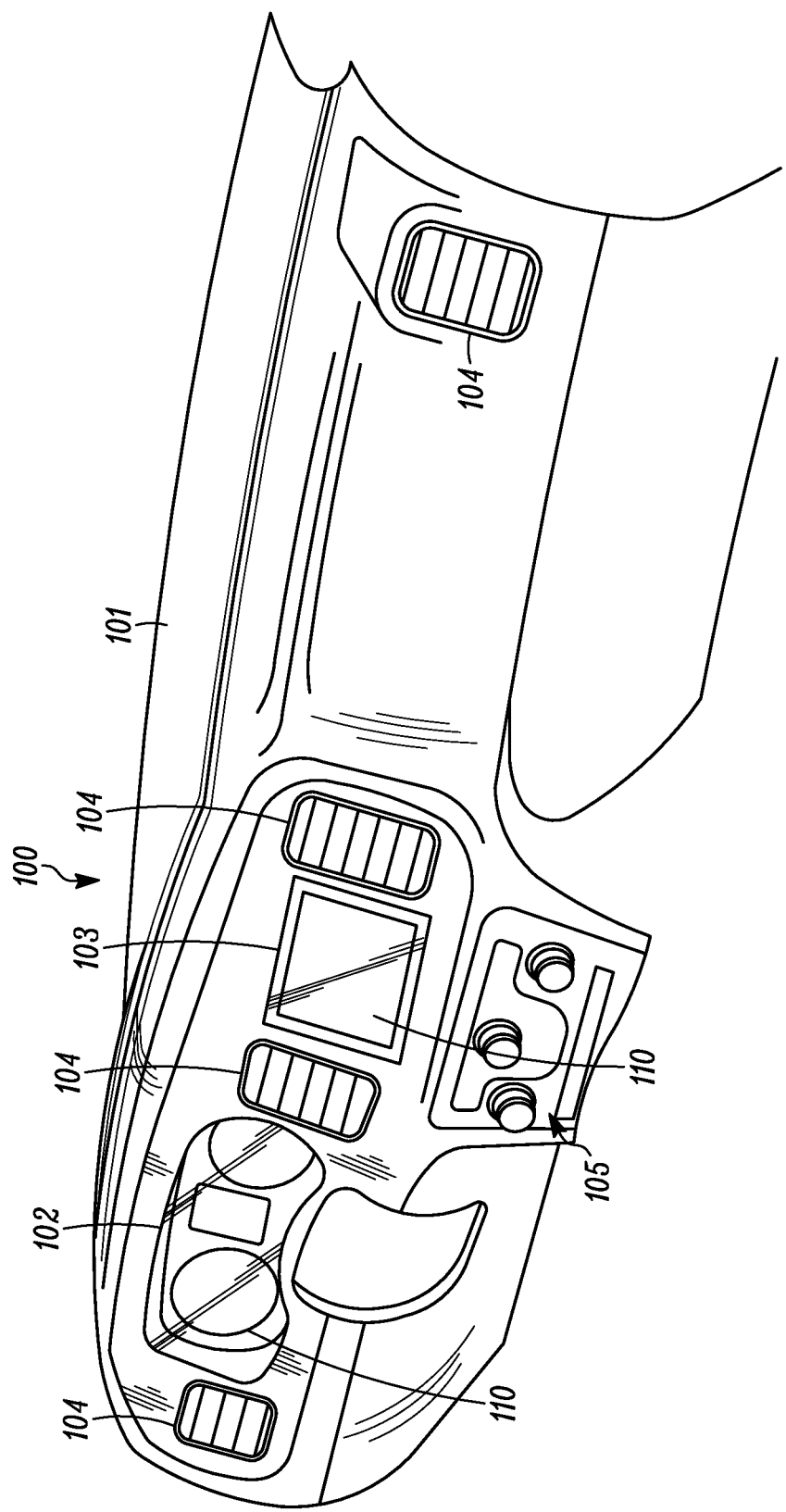
FIG. 1 depicts a vehicle interior with a lens assembly in accordance to an embodiment.

FIG. 1 depicts a partial vehicle 100 that includes a dashboard 101, which can include a plurality of displays 102, 103 and vents 104 and controls 105. The display 102 can be an instrument cluster, which can display various vehicle parameters, e.g., speed, tachometer, warning symbols, and other vehicle parameters. The display 103 can be a human-machine interface for the vehicle or the infotainment system of the vehicle. In an example, the display 102 may also operate as a human-machine interface. In an example, the display 103 is part of the infotainment head unit. Display 103 can show video, audio, navigational, environmental information to the driver or passenger. Display 103 can further be an input/output device that can include touch sensors, physical buttons, keys, knobs or other such I/O modalities to input data into the vehicle. The I/O device can include circuitry that is at the rear side of the display. Each of the displays 102, 103 may include a lens assembly 110 as described herein facing the interior of the vehicle. Such a lens assembly 110 will have at least one surface that a person can touch. This may be referred to as an "A" surface and faces the interior of the vehicle cabin. In many instances, people prefer a glass surface relative to a polymer surface to their touch. To provide a premium material finish, the A surface may be comprised of real glass, with no film covering, e.g., no polymer film on the A surface of the glass. The lens assembly 110 may be positioned so that it is essentially flush with surrounding surfaces of the dashboard, the A surface can be open to the user and touchable. The edges of the glass layer may be touchable and visible. The lens assembly 110, if made of glass or having a glass layer, must pass various safety regulations to be used in a vehicle.

Figure 2:
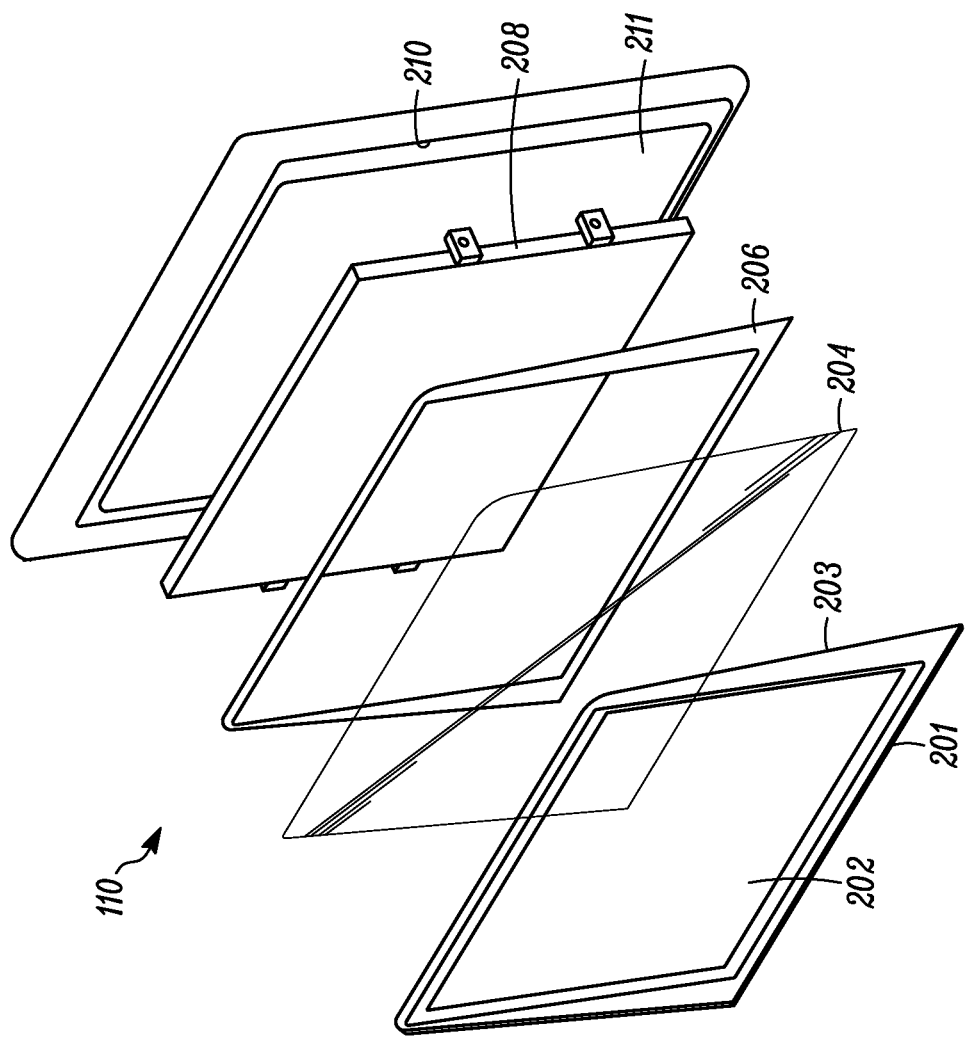
FIG. 2 depicts an exploded view of a lens assembly in accordance to an embodiment.

FIG. 2 depicts an exploded view of the lens assembly 110. FIG. 3 depicts a front view (e.g., toward the A surface) of the lens assembly 110. A glass layer 201 forms the front surface (e.g., the A surface), which faces the user and can be contacted by a user. The front surface may be a planar shape, e.g., rectangular or other polygon shape. The front surface may be flat or slightly curved, e.g., up to about two degrees, up to about 5 degrees, or up to 10 degrees. The front surface may be cylindrically curved along a horizontal direction, e.g., at the central horizontal axis. The front surface may be cylindrically curved along a vertical direction, e.g., at the central vertical axis. The front surface may include compound curves along either the horizontal direction or the vertical direction or both. The front surface may be flat, but have a pronounced round feature at the edges to grant an effect of the glass sloping or falling toward the edge. This front surface faces to the bottom left of the FIG. 2 illustrated embodiment. The rear side (e.g., the "B" side) of the glass layer 201 is the side that is not directly seen or cannot be touched by a vehicle user. That is, the rear side is within the dashboard when the lens assembly 110 is mounted in the vehicle 100. In an example, the glass layer 201 can be a one glass structure that is adapted to be touched on at least one side by a user and it allows sensing of touches by a user. The glass layer 201 provides a display area 202 through which images can be transmitted, e.g., by an emitter layer, OLED layer, or an LCD module.

A mask 203 is fixed to the rear side of the retention layer 204. The mask 203 covers the part of the retention film 204 and glass layer 201 that will not be used for display. In an example, the mask 203 is a thin, dark colored, film or ink that is screen printed to the rear side of the glass. In an example, the mask is black. The mask 203 can include paint, infrared transmissive ink, etc. The mask 203 can be opaque. The mask 203 can be opaque colors other than black. The mask 203 frames the display area 202 at the glass layer 201. The mask layer may match a color of other colors in the vehicle.

The glass layer 201 can be chemically treated or spray treated with surface treatments including anti-glare, antireflection, anti-fingerprint, atomic layer deposition (ALD), compressive coating, etc. However, these treatments cannot use a film-based treatment on the front surface, e.g., a polymer layer is not fixed to the front surface of the glass layer.

The retention film 204 is fixed to the rear side of the glass layer 201. The retention layer 204 can be a film or a thin film, e.g., ⅕, 1/10, 1/20 or less the thickness of the glass layer 201. The retention film 204 is optically clear so as to not interfere with an image being shown by a display through the glass layer 201 and the retention film 204. The retention film 204 can be an anti-shatter film combined with an optically clear bonding layer. Examples of such layers are polyvinyl butyrate (PVB), EVP, OCA, OCR, or the like. In the case of OCR (optically clear resin), the material is applied to the structure as a liquid but cures, or otherwise hardens to effectively act as a film in the final application. The retention film 204 further acts to prevent the glass layer 201, if impinged by an object that causes it to fracture, from expelling small particulate, shards, or otherwise dangerous or sharp material into the vehicle cockpit. More specifically, the retention film 204 assists the lens assembly in meeting regulatory standards for glass used in a vehicle. The retention film 204 can further act as a bond layer that adheres to the rear surface of the glass layer 201. The retention film 204 can be two sided so that it adheres subsequent structures thereto. In an example, the retention film 204 covers the entirety of the rear surface of the glass layer 201. In an example, the retention film 204 is adhesive on both sides. The retention film 204 can be an anti-shatter film that will hold the glass layer together even if the glass layer is broken. In an example, the retention film 204 may be seven mils or less.

A spacing layer 206 is positioned around the perimeter the rear surface of the assembly of the retention film 204 and glass layer 201. In an example, the spacing layer 206 is an adhesive layer. The spacing layer 206 can be a compression set adhesive layer. In an example, the spacing layer 206 is a double sided tape that will take a compression set. The spacing layer 206 may be compressed by about 50% when the compression set is performed. The tape can be an inflexible substrate with adhesive on both sides thereof. The spacing layer 306 can be a two sided adhesive. The spacing layer 206 can act to mechanically support an area of the glass layer 201 larger than the outline of the display generating device. In an example, the spacing layer 206 covers less of the glass layer than the mask 203. In an example, the spacing layer 206 is thicker than either the glass layer, the retention film 204, or both, even when in its compressed position.

A display generator 208 is fixed to the retention layer 204 at the rear surface of the glass layer 201 with the interior aperture 207 of the spacing layer 206. The display generator 208 can emit a video display toward the rear surface of the glass layer 201. In an example, the display generator 208 can be a thin film transistor array. In an example, the display generator 208 can be a liquid crystal display or an organic light emitting diode display. The video, e.g., light, transmits through the retention layer 204 and the display area 202 of the glass layer 201. In an example, the front, emitting surface of the display generator 208 is in direct mechanical contact with the retention layer 204 and the rear surface of the glass layer 201 to mechanically support the entirety of the display area 202. However, in an example embodiment, the display generator has a smaller area than the glass layer such that the glass play extends outwardly from the perimeter of the display generator. The B surface of the glass layer has a larger area than the surface of the display generator that faces the B surface.

A frame 210 includes a center recess or aperture to receive the display generator 208, which can be connected to the frame through the use of connectors, e.g., bolts, screws, pins, latches and the like. A rear side of the spacing layer 206 can be in mechanical contact with a support structure 211 of the frame 210 and the part of the glass layer 201 outside the display area 202. Accordingly, the frame 210 supports glass layer through either the display generator 208 or the spacing layer 206. In an example, the frame 210 can compress the spacing layer 206 to either activate the adhesive or compress the spacing layer 206 so that it mechanically supports the corresponding part of the glass layer 201. The frame 210 may be on a coincident plane with the front of the display generator 208. The frame opening has complementary geometry to the display generator 208. The frame 210 is also aligned with the spacing layer 206.

In an example embodiment, the outline of the cover glass, e.g., the glass layer 201, is larger than the outline of the display generator 208, creating a potential cantilever beam of the glass, which may be a failure point of the cover glass during impact, torsion or other such applied mechanical load. Some of the presently described structures support the glass layer to its outer edge from behind to minimize the effects of a potential cantilever beam.

FIG. 4 depicts a schematic side view of the lens assembly 110. The glass layer 201 includes a front surface facing to the left and a rear surface facing to the right. The front surface is the surface that a person in a vehicle or using an electronic component or system may touch. The retention film 204 is adhered to the rear surface directly and over the part masked by mask 203. The display generator 208 is fixed, e.g., adhered to the retention layer 204, which may be a two sided adhesive. The spacing layer 206 is positioned around the display generator. In an example, the spacing layer 206 is in contact with both the retention layer 204 and the display generator 208. In an example, the spacing layer 206 defines an interior space of the display generator 208 with a tolerance of about 0.5 mm, +/−0.1 mm, or up to 1.0 mm, +/−0.1 mm. The frame 210 contacts and compresses the spacing layer 206.

Figure 5:
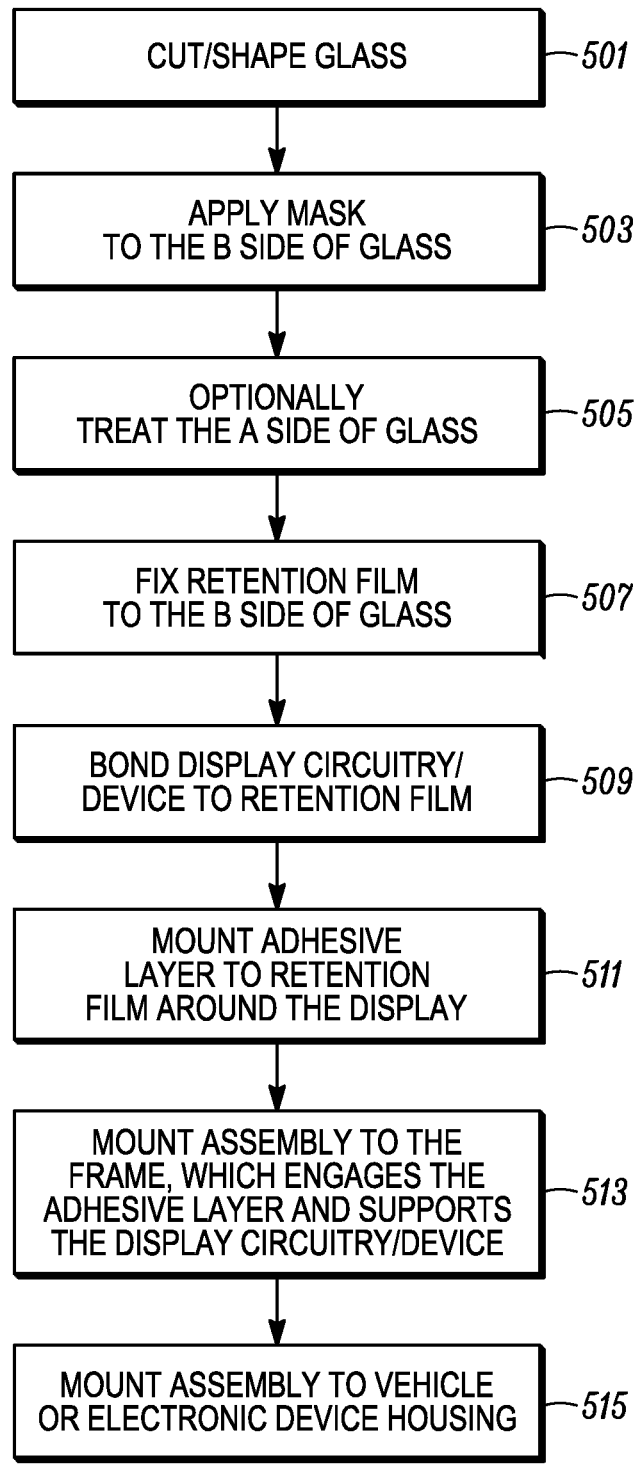
FIG. 5 depicts a fabrication process for the lens assembly in accordance to an embodiment.

FIG. 5 depicts process 500 for forming the lens assembly 110. At 501, the glass layer is cut or shaped. Edge work can be performed to smooth the edges. At 503, the mask is applied to the rear surface of the glass. The mask can be an opaque (e.g., black) thin film coating that blocks areas of the glass from transmitting light, e.g., the masked areas are opaque. At 505, the front surface of the glass layer can be treated. Such a treatment does not include applying a film to the front surface. The front surface may be treated with ion exchange strengthening treatment, atomic layer deposition, flame polishing, dealkalization treatment, or combinations thereof. Examples of glass strengthening can be found in U.S. Pat. Nos. 4,218,230; 4,273,832; 4,290,793; 4,702,760; 8,780,314; and 2014/0352355, which are hereby incorporated by reference. Atomic layer deposition can be performed on both sides of the glass layer. In an example, treating the front surface is limited to not changing the texture or feel of the surface from a glass to a plastic type texture or feel.

At 507, the retention film is fixed to the rear surface over the glass and the mask. The retention film acts as an anti-shatter film. The retention film covers the entirety of the rear surface in an example.

At 509, the display generator is bonded to the back side of the retention film. In an example, optical bonding is used to fix the display generator to the glass layer through the retention film. The display generator may include an LCD layer or an LED layer.

At 511, the spacing layer, which can be adhesive, is mounted outside the display generator on the retention film. In an example, the spacing layer is a two sided adhesive layer that is compressive.

At 513, the assembly is mounted to a frame with the frame engaging the spacing layer, e.g., compressing the spacing layer. The display generator may be mounted to the frame using connectors, e.g., from the side and the back.

At 515, this assembly is mounted into a vehicle or an electronic housing.

Alternatively, the method may forgo the use of a perimeter bond instead using an optically clear adhesive film or resin between the active area of the display generator and the visible window defined by the mask on the back side of the glass lens.

Figure 6B:
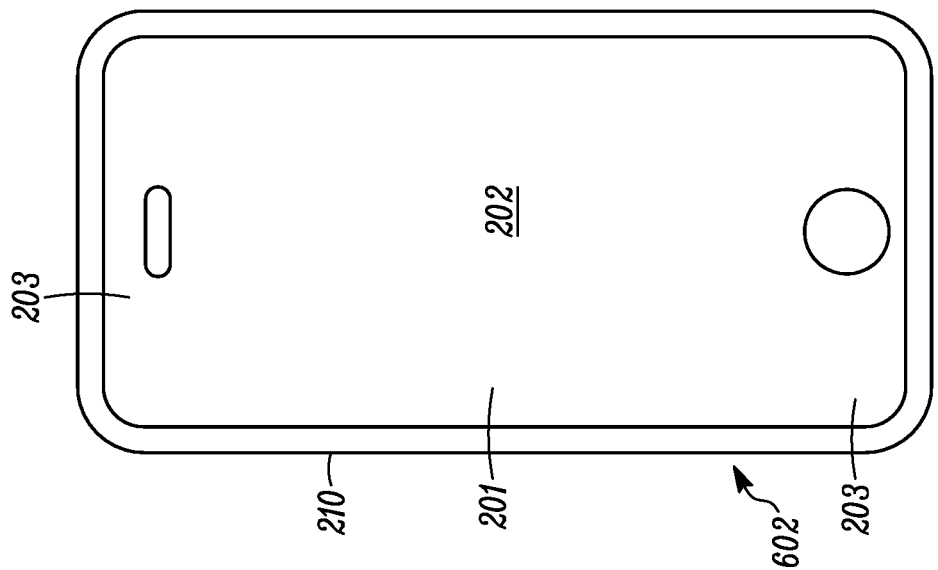
FIG. 6B schematically depicts a lens assembly in an electronic device in accordance to an embodiment.
Figure 6A:
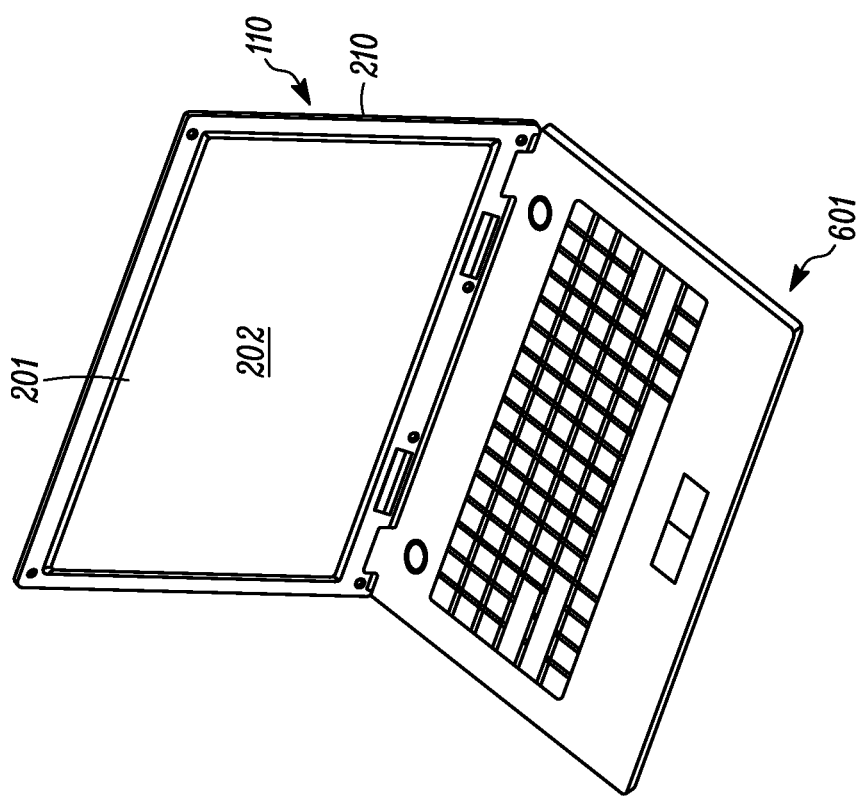
FIG. 6A schematically depicts a lens assembly in an electronic device in accordance to an embodiment.

FIG. 6A shows an electronic device 601, e.g., a computer, that includes a lens assembly 110 according to the various examples described herein. A glass layer 201 with a display area 202 is mounted in a frame 210. The lens assembly 110 may be a touchscreen as well as a display.

FIG. 6B shows an electronic device 602, e.g., a mobile electronic device, phone, smart phone and the like, that includes a lens assembly 110 according to the various examples described herein. A glass layer 201 with a display area 202 is mounted in a frame 210. The mask 203 defines the display area 202. The lens assembly 110 may be a touchscreen as well as a display.

The present lens assembly 110 can be used in other mobile electronic devices, e.g., headphones, speakers, tablets and the like.

In the traditional application of glass in an automotive environment or electronic device environment, the application of a polymeric retention film, sometimes referred to as an anti-shatter film (ASF) yields a glass surface that to the touch feels different than untreated glass. Such a treatment yields a more expensive piece part cost, the end result is a "cheaper" feeling to a person touching the polymer treated glass. The present inventors recognized the needs for a solution to provide the premium touch experience on a glass surface while complying with the regulatory impact requirements. Thus, some of the described embodiments have a glass surface facing a user with the other layers behind the glass and set into a surrounding body, e.g., a vehicle assembly, a housing, a case or the like.

The invention proposed is a glass-surfaced module that can be, in the case of an automotive interior application, the substrate could be the vehicle instrument panel and in the case of an electric device, the substrate could be the chassis frame that supports the display module, etc. The order of stackup from the touch surface to the substrate can be a glass substrate (this is the touch interface surface), black masking in the display inactive area, a retention film, double sided adhesive layer, a display module (e.g., an LCD display, an OLED display, etc.), and a rigid support element that can support the glass through the adhesive layer and the display module. Such a configuration allows for a specification-compliant glass surface design with a premium touch feel, and a glass geometry that may be of any two dimensional size and shape.

The present disclosure describes a structure with a display generator. However, the present disclosure includes embodiments that do not include a display generator. For example, the display generator may or may not be included or other electronics can be used. In some designs, it could be replaced with a capacitive touch sensor module. In another embodiment, the glass may be a purely cosmetic element with no electronic device embedded behind its surface.

The embodiments of the display 102 or 103 may include a plurality of circuits, electrical devices, and at least one controller. All references to the circuits, the at least one controller, and other electrical devices and the functionality provided by each, are not intended to be limited to encompassing only what is illustrated and described herein. Such circuits may drive the display generator to provide a visual display through the transparent area of the glass layer.

It is recognized that some examples described herein may include a controller, which may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation (s) disclosed herein. The devices and software may execute the processes and methods described herein. The controller may be part of the display circuitry that produces images through the lens assembly within the perimeter of the glass defined by the mask layer. The controller may also include touch sensing circuitry to allow a user who touches the first side of the glass layer to input through the lens assembly to circuitry of the controller and to additional electronic systems.

A lens assembly is described that includes a glass layer with a first side to be engaged by a person and a second side, a retention film is fixed to the second side and is transparent, a display generator is fixed to the retention film, a spacing layer is fixed on the retention layer around the display generator, a support frame engages the spacing layer and supports the display generator such that the glass layer is supported about its entire area by the retention film and mechanically supported by both the display generator and the frame, and with the first side being free from a treatment film layer. In an example, a mask is applied to the glass layer to define a display area, e.g., before the retention layer is added to the rear side of the glass layer. In an example, the front side of the glass layer is treated with atomic layer deposition or ionic treatment to cure defects in the glass. In an example, the lens assembly is mounted in a vehicle as an infotainment device or an instrument cluster. In an example, the lens assembly is mounted in a portable electronic device or a large device, e.g., a vehicle. The first side of the glass layer is free of the retention layer or safety layer. This provides an improved feel to a user. The first side of the glass layer may be treated to improve the glass surface but is free from a polymer layer or a polymer film that is strong enough to act a retention layer to provide the safety actions if the glass is broken, e.g., in a vehicle crash or dropping the electronic device.

While example embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A lens assembly, comprising:
a glass layer with a first side to be engaged by a person and a second side;
a retention film fixed to the second side and is transparent, the retention film being an anti-shatter film covering the entire second side of the glass layer;
a display generator fixed to the retention film, the display generator being smaller in area than the glass layer;
a spacing layer fixed on the retention film around the display generator, wherein the spacing layer is compressive and includes adhesive on each side thereof to engage at least the retention film; and a support frame compressing the spacing layer by 50% to adhere to at least the retention film and the display generator, and supporting the display generator and the glass layer.

2. The lens assembly of claim 1, further comprising a mask applied to the glass layer to define a display area.

3. The lens assembly of claim 2, wherein the mask is applied before the retention film is added to the second side of the glass layer.

4. The lens assembly of claim 3, wherein the spacing layer is compressed by the support frame onto the glass layer.

5. The lens assembly of claim 4, wherein the first side is a front side of the glass layer and is treated with atomic layer deposition or ionic treatment to cure defects in the glass layer.

6. The lens assembly of claim 5, wherein the glass layer is mechanically supported by both the display generator and the support frame.

7. The lens assembly of claim 6, wherein the support frame is adapted to be mounted in a vehicle as an infotainment device or an instrument cluster, or in a portable electronic device.

8. The lens assembly of claim 2, wherein the mask extends inwardly further than the spacing layer.

9. The lens assembly of claim 1, wherein the glass layer is supported about its entire area by the retention film and mechanically supported by both the display generator and the support frame.

10. The lens assembly of claim 1, wherein the second side is a rear side remote from the front side that is contactable by the person.

11. The lens assembly of claim 1, wherein the spacing layer is compressed by the support frame onto the glass layer.

12. A lens assembly method, comprising:
fixing a mask on a rear surface of a glass layer;
fixing a retention layer to cover the mask and the rear surface of the glass layer with a front surface of the glass layer being free from the retention film;
fixing a spacing layer on a perimeter of the retention layer over at least part of the mask;
fixing a display generator fixed to the retention layer within the spacing layer; and
engaging a support frame to the spacing layer to support the display generator and to support the glass layer through the spacing layer and the retention film by compressing the spacing layer against the retention film to compression set the spacing layer to the retention layer.

13. The method of claim 12, wherein fixing the mask includes defining a display area through the glass layer interior of the mask layer.

14. The method of claim 13, wherein fixing the mask is performed before fixing the retention film such that the mask layer is intermediate the rear surface of the glass layer and retention film around a perimeter of the glass layer.

15. The method of claim 14, wherein engaging the support frame compresses the spacing layer by 50%.

16. The method of claim 15, wherein fixing the spacing layer includes fixing the spacing layer that has a dimension that extends radially inwardly less than the mask, and wherein fixing the display generator includes fixing a thin film transistor layer within the spacing layer and over an inner edge of the mask.

17. The lens assembly of claim 1, wherein the spacing layer is thicker than the each of the glass layer and the retention film when compressed by the support frame.

* * * * *